(12) United States Patent
Wu et al.

(10) Patent No.: US 12,051,938 B2
(45) Date of Patent: Jul. 30, 2024

(54) VEHICLE POWER MANAGEMENT SYSTEM AND POWER MANAGEMENT METHOD THEREOF

(71) Applicant: Getac Technology Corporation, New Taipei (TW)

(72) Inventors: Ming-Zong Wu, Taipei (TW); Chun-Kai Chang, Taipei (TW); Li-Wei Cheng, Taipei (TW)

(73) Assignee: Getac Technology Corporation, New Taipei (TW)

( * ) Notice: Subject to any disclaimer, the term of this patent is extended or adjusted under 35 U.S.C. 154(b) by 1 day.

(21) Appl. No.: 18/301,972

(22) Filed: Apr. 17, 2023

(65) Prior Publication Data
US 2024/0146091 A1 May 2, 2024

Related U.S. Application Data

(60) Provisional application No. 63/420,467, filed on Oct. 28, 2022.

(51) Int. Cl.
*H02J 7/34* (2006.01)
*B60L 3/00* (2019.01)
(Continued)

(52) U.S. Cl.
CPC ............ *H02J 7/342* (2020.01); *B60L 3/0046* (2013.01); *B60R 16/03* (2013.01); *B60R 16/033* (2013.01);
(Continued)

(58) Field of Classification Search
CPC ...... H02J 7/342; H02J 7/0047; H02J 7/00712; B60R 16/033
See application file for complete search history.

(56) References Cited

U.S. PATENT DOCUMENTS 9,347,414 B2 5/2016 Proebstle
10,910,875 B2 2/2021 Teng
(Continued)

FOREIGN PATENT DOCUMENTS

CN 104615037 B 8/2019
CN 110979221 A 4/2020
(Continued)

OTHER PUBLICATIONS

Search Report issued on Oct. 2, 2023 for EP application No. 23168232.9.

*Primary Examiner* — Daniel Cavallari
(74) *Attorney, Agent, or Firm* — Li & Cai Intellectual Property Office

(57) ABSTRACT

A vehicle power management system and a power management method thereof are provided. The power management method includes: determining, by a microcontroller, whether or not a voltage of an ignition-off signal is less than a voltage threshold when the microcontroller receives the ignition-off signal; stopping a vehicle power supply from charging a backup battery, and using the vehicle power supply to charge a back-end load; activating a counter of the microcontroller; stopping the vehicle power supply from charging the back-end load, and using the backup battery to charge the back-end load when a counting time of the counter reaches a first time threshold; sending, by the microcontroller, the ignition-off signal to the back-end load when the counting time of the counter reaches a second time threshold; and stopping the backup battery from charging the back-end load when the counting time of the counter reaches a third time threshold.

12 Claims, 13 Drawing Sheets

(51) Int. Cl.
    *B60R 16/03*         (2006.01)
    *B60R 16/033*        (2006.01)
    *H02J 9/06*          (2006.01)
    *H02J 7/00*          (2006.01)

(52) U.S. Cl.
    CPC ............ *H02J 9/061* (2013.01); *H02J 7/0024*
            (2013.01); *H02J 7/0047* (2013.01); *H02J*
            *7/007* (2013.01); *H02J 7/00712* (2020.01)

(56) References Cited

U.S. PATENT DOCUMENTS

| | | |
|---|---|---|
| 11,059,371 B2 | 7/2021 | Kageyama et al. |
| 2010/0066302 A1 | 3/2010 | Gregg et al. |
| 2015/0336468 A1 | 11/2015 | Sugiyama et al. |
| 2020/0259363 A1 | 8/2020 | Fukae |
| 2021/0237670 A1 | 8/2021 | Takahara |
| 2021/0396547 A1 | 12/2021 | Kamel et al. |
| 2022/0032860 A1 | 2/2022 | Pronina et al. |
| 2022/0089111 A1 | 3/2022 | Morita |
| 2022/0103007 A1 | 3/2022 | Shindo |
| 2022/0153285 A1 | 5/2022 | Ide |
| 2022/0200311 A1 | 6/2022 | Oonishi |
| 2022/0258647 A1 | 8/2022 | Joao |

FOREIGN PATENT DOCUMENTS

| | | |
|---|---|---|
| CN | 115230525 A | 10/2022 |
| KR | 101315645 B1 | 10/2013 |
| TW | M313374 U | 6/2007 |
| TW | 202210331 A | 3/2022 |
| TW | 202239656 A | 10/2022 |

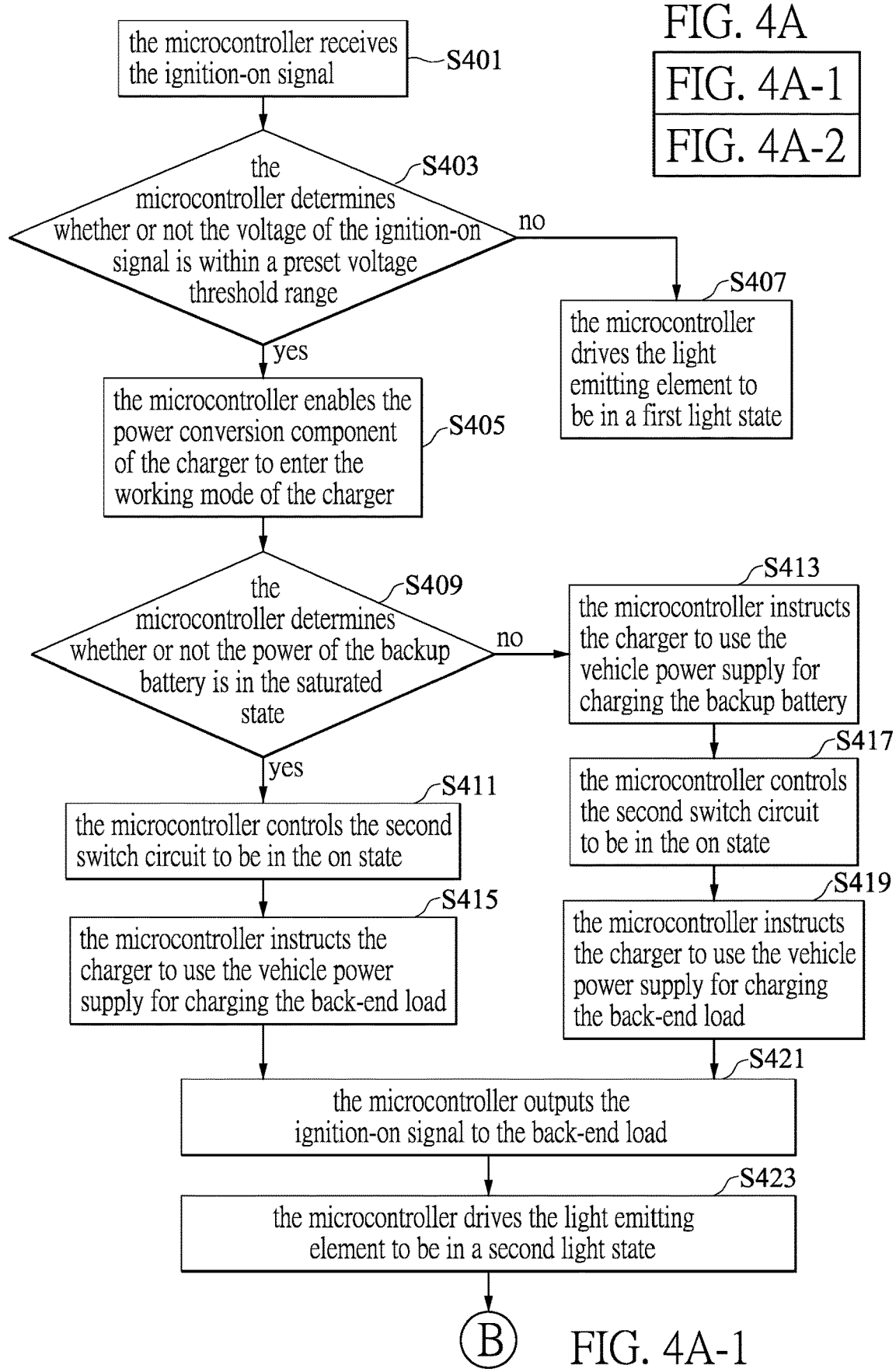

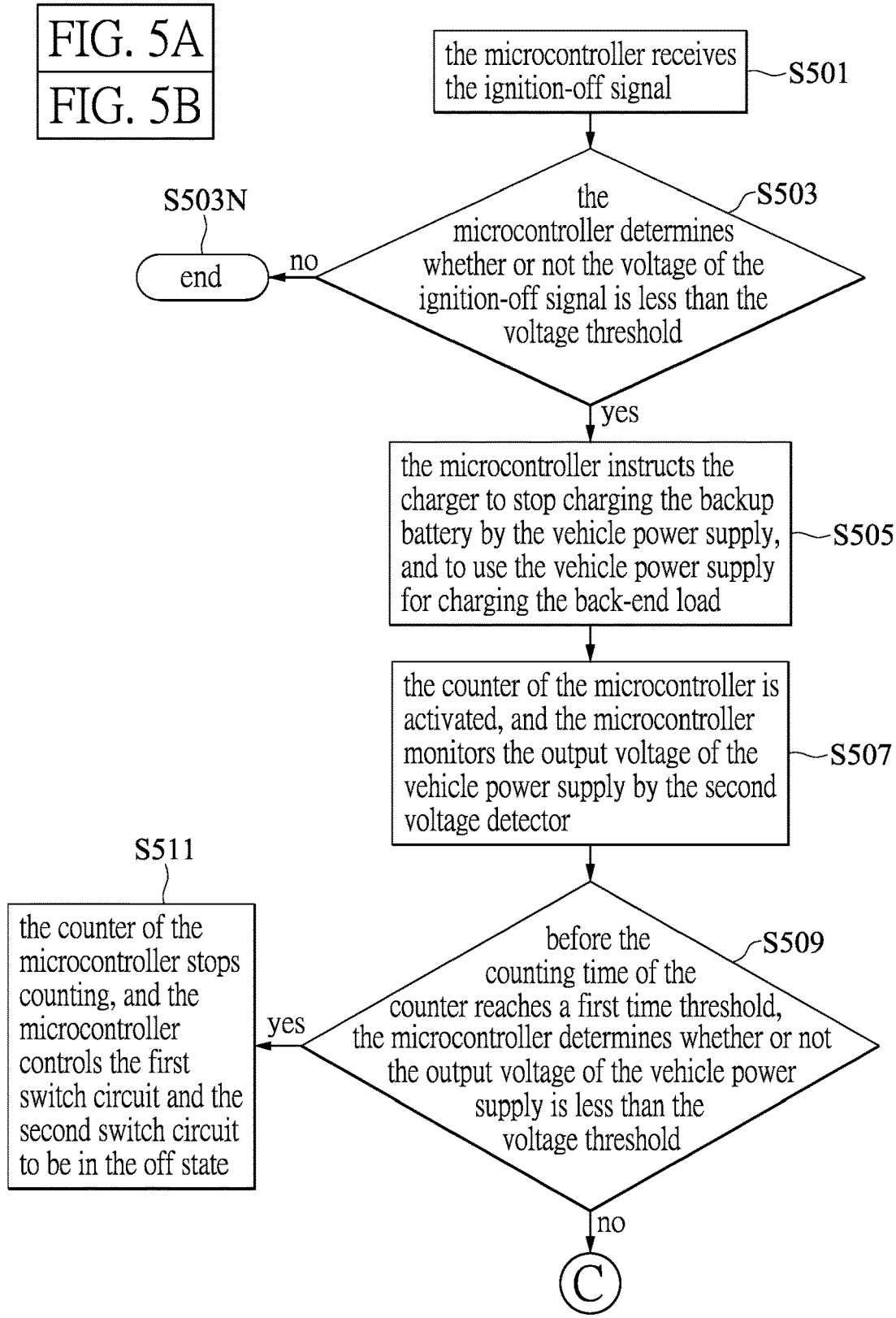

VEHICLE POWER MANAGEMENT SYSTEM AND POWER MANAGEMENT METHOD THEREOF

CROSS-REFERENCE TO RELATED PATENT APPLICATION

This application claims the benefit of priority to the U.S. Provisional Patent Application Ser. No. 63/420,467, filed on Oct. 28, 2022, which application is incorporated herein by reference in its entirety.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a power management system and a power management method thereof, and more particularly to a vehicle power management system and a power management method thereof.

BACKGROUND OF THE DISCLOSURE

Operations of vehicle-use digital video recorders (DVR) and power for starting vehicle engines are currently provided by vehicle power supplies. Since computations performed by the digital video recorder and its peripheral accessories incur high power loss, the digital video recorder can work properly only when the vehicle engine is started.

Based on current environmental protection regulations, when a vehicle is parked on a roadside, a driver must turn off the vehicle engine, thereby shutting down the digital video recorder. In addition, apart from the digital video recorder, the driver may install other vehicle load equipment on the vehicle, so that power consumption of the vehicle power supply is increased. As a result, the driver is often unaware that there is insufficient power in the vehicle power supply, such that the vehicle engine cannot be started again.

SUMMARY OF THE DISCLOSURE

In response to the above-referenced technical inadequacies, the present disclosure provides a vehicle power management system and a power management method thereof.

In order to solve the above-mentioned problems, one of the technical aspects adopted by the present disclosure is to provide a vehicle power management system. The vehicle power management system is adapted to a back-end load and a vehicle power supply. The vehicle power management system includes a microcontroller, a charger, a first switch circuit, a second switch circuit, and a backup battery. The microcontroller is connected to the vehicle power supply and the back-end load. The microcontroller includes a counter. The charger is connected to the microcontroller. The first switch circuit is connected to the charger, the microcontroller and the vehicle power supply. The second switch circuit is connected to the microcontroller, the charger and the back-end load. The backup battery is connected to the charger. When the microcontroller receives an ignition-off signal from the vehicle power supply, the microcontroller determines whether or not a voltage of the ignition-off signal is less than a first voltage threshold. When the voltage of the ignition-off signal is less than the first voltage threshold, the charger stops using the vehicle power supply to charge the backup battery and uses the vehicle power supply to charge the back-end load. When a counting time of the counter reaches a first time threshold, the charger stops using the vehicle power supply to charge the back-end load and uses the backup battery to charge the back-end load. When the counting time of the counter reaches a second time threshold, the microcontroller sends the ignition-off signal to the back-end load. When the counting time of the counter reaches a third time threshold, the charger stops using the backup battery to charge the back-end load.

In order to solve the above-mentioned problems, another one of the technical aspects adopted by the present disclosure is to provide a power management method of a vehicle power management system. The power management method includes: determining, by a microcontroller, whether or not a voltage of an ignition-off signal is less than a first voltage threshold when the microcontroller receives the ignition-off signal; stopping a vehicle power supply from charging a backup battery, and using the vehicle power supply to charge a back-end load when the voltage of the ignition-off signal is less than the first voltage threshold; activating a counter of the microcontroller; stopping the vehicle power supply from charging the back-end load, and using the backup battery to charge the back-end load when a counting time of the counter reaches a first time threshold; sending, by the microcontroller, the ignition-off signal to the back-end load when the counting time of the counter reaches a second time threshold; and stopping the backup battery from charging the back-end load when the counting time of the counter reaches a third time threshold.

Therefore, in the vehicle power management system and the power management method thereof provided by the present disclosure, time points at which the vehicle power supply and the backup battery charge vehicle load equipment and a time point at which the ignition-off signal is sent to the back-end load can be controlled programmatically. In this way, power of the vehicle power supply will not be excessively consumed by the back-end load, so that the power of the vehicle power supply can be sufficient for the engine to be started again.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 1A and FIG. 1B are flowcharts of an automatic diagnosis method of a vehicle power management system according to one embodiment of the present disclosure;

FIG. 4A-1, FIG. 4A-2 and FIG. 4B are flowcharts illustrating another example of the power management method when the ignition on-event occurs to the vehicle power management system of FIG. 2;

FIG. 5A and FIG. 5B are flowcharts illustrating one example of the power management method when an ignition-off event occurs to the vehicle power management system of FIG. 2; and FIG. 6A-1, FIG. 6A-2, FIG. 6B and FIG. 6C are flowcharts illustrating another example of the power management method when the ignition-off event occurs to the vehicle power management system of FIG. 2.

DETAILED DESCRIPTION OF THE EXEMPLARY EMBODIMENTS

Figures 1, 1A, 1B:
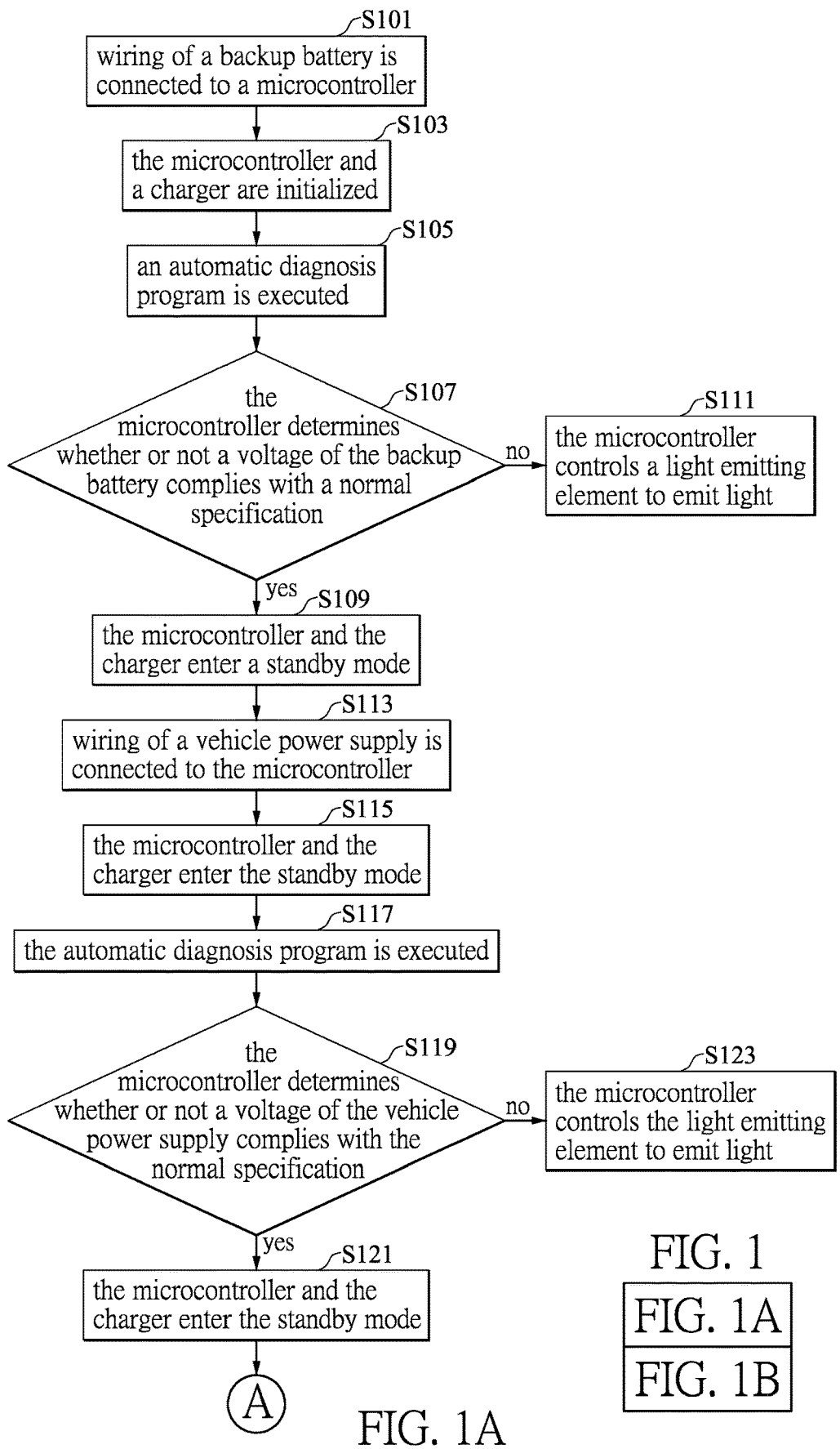
Figure 1B:
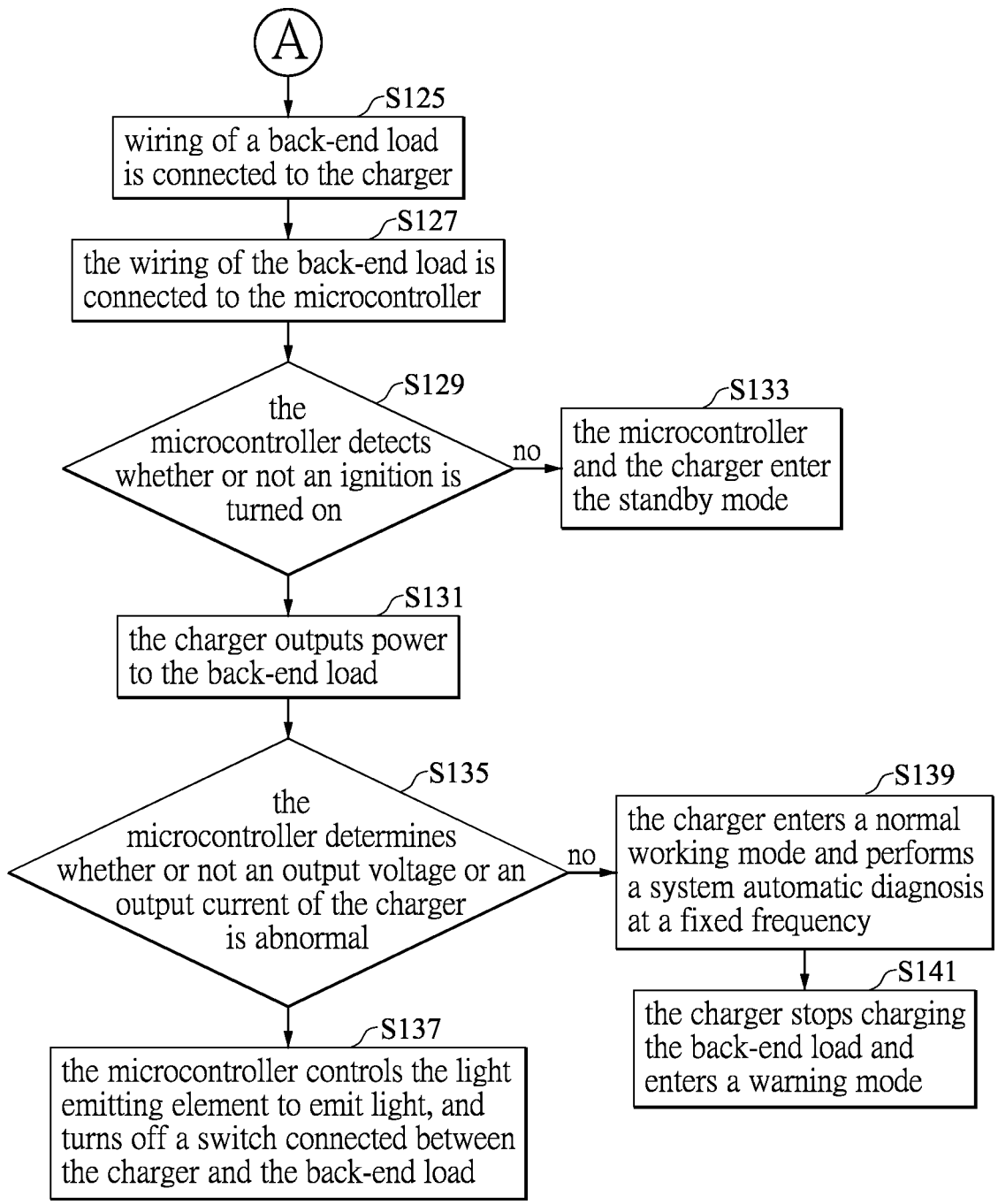

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like. In addition, the term "connect" in the context of the present disclosure means that there is a physical connection between two elements, and the two elements are directly or indirectly connected.

During installation and a load output of a vehicle power management system, an automatic diagnosis method described below can be used to detect abnormality of the vehicle power management system and achieve an energy-saving effect. FIG. 1A and FIG. 1B are flowcharts of an automatic diagnosis method of a vehicle power management system according to one embodiment of the present disclosure. In step S101, wiring of a backup battery is connected to a microcontroller. In step S103, the microcontroller and a charger are initialized. In step S105, an automatic diagnosis program is executed. In step S107, the microcontroller determines whether or not a voltage of the backup battery complies with a normal specification. If so, step S107 is followed by step S109. If not, step S107 is followed by step S111.

In step S109, the microcontroller and the charger enter a standby mode. In step S111, the microcontroller controls a light emitting element to emit light. Specifically, the light of the light emitting element serves to warn abnormality of the voltage of the backup battery.

Step S109 is followed by step S113. In step S113, wiring of a vehicle power supply is connected to the microcontroller. In step S115, the microcontroller and the charger enter the standby mode. In step S117, the automatic diagnosis program is executed. In step S119, the microcontroller determines whether or not a voltage of the vehicle power supply complies with the normal specification. If so, step S119 is followed by step S121. If not, step S119 is followed by step S123.

In step S121, the microcontroller and the charger enter the standby mode. In step S123, the microcontroller controls the light emitting element to emit light. Specifically, the light of the light emitting element serves to warn of an abnormality of the voltage of the vehicle power supply.

Step S121 is followed by step S125. In step S125, wiring of a back-end load is connected to the charger. In step S127, the wiring of the back-end load is connected to the microcontroller. In step S129, the microcontroller detects whether or not an ignition is turned on. If so, step S129 is followed by step S131. If not, step S129 is followed by step S133. In step S131, the charger outputs power to the back-end load. In step S133, the microcontroller and the charger enter the standby mode. Step S131 is followed by step S135. In step S135, the microcontroller determines whether or not an output voltage or an output current of the charger is abnormal. If so, step S135 is followed by step S137. If not, step S135 is followed by step S139. In step S137, the microcontroller controls the light emitting element to emit light, and turns off a switch connected between the charger and the back-end load. In step S139, the charger enters a normal working mode and performs a system automatic diagnosis at a fixed frequency. Step S139 is followed by step S141. In step S141, the charger stops charging the back-end load and enters a warning mode.

Figure 2:
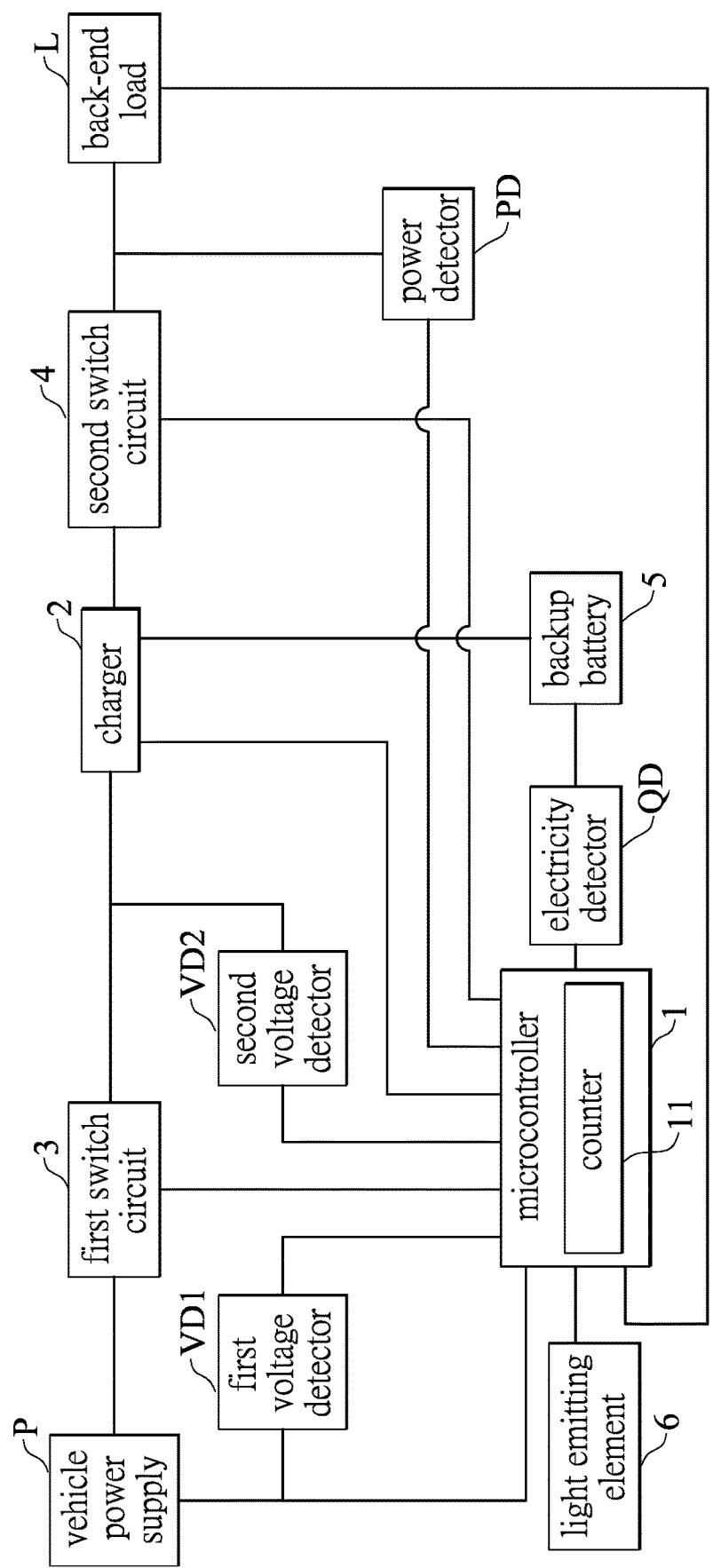
FIG. 2 is a functional block diagram of the vehicle power management system according to one embodiment of the present disclosure.

FIG. 2 is a functional block diagram of the vehicle power management system according to one embodiment of the present disclosure. Referring to FIG. 2, the vehicle power management system is adapted to a vehicle power supply P and a back-end load L. The vehicle power management system includes, for example, a microcontroller 1, a charger 2, a first switch circuit 3, a second switch circuit 4, a backup battery 5, a light emitting element 6, a first voltage detector VD1, a second voltage detector VD2, a power detector PD, and an electricity detector QD, but is not limited thereto.

The microcontroller 1 is connected to the vehicle power supply P, the first voltage detector VD1, the second voltage detector VD2, the power detector PD, the back-end load L, the charger 2, the first switch circuit 3, the light emitting element 6, and the electricity detector QD. The microcontroller 1 includes a counter 11.

The charger 2 is further connected to the first switch circuit 3, the second switch circuit 4, the backup battery 5, the second voltage detector VD2, and the power detector PD. The first switch circuit 3 is further connected to the vehicle power supply P and the second voltage detector VD2. The second switch circuit 4 is further connected to the charger 2, the power detector PD, and the back-end load L. The backup battery 5 is connected to the electricity detector QD and the charger 2.

When the ignition is in an on state, the vehicle power supply P outputs an ignition-on signal to the microcontroller 1, and the microcontroller 1 reads a voltage of the ignition-on signal by the first voltage detector VD1. Similarly, when the ignition is in an off state, the vehicle power supply P outputs an ignition-off signal to the microcontroller 1, and the microcontroller 1 reads a voltage of the ignition-off signal by the first voltage detector VD1.

When the counter 11 of the microcontroller 1 is activated, the counter 11 starts counting. When the counter 11 is deactivated, the counter 11 stops counting and clears a counting time.

The charger 2 includes a power conversion component, and the microcontroller 1 is used to enable or disable the power conversion component of the charger 2. When the power conversion component of the charger 2 is enabled, the charger 2 enters a working mode. When the power conversion component of the charger 2 is disabled, the charger 2 enters a backup battery power supply mode. When the charger 2 enters the backup battery power supply mode, although the vehicle power supply P is connected to the vehicle power management system, the charger 2 still only uses the backup battery 5 to charge the back-end load L. At this time, the charger 2 does not convert power of the vehicle power supply P. Instead, the charger 2 only cuts off the power of the vehicle power supply P, and turns on a switch on a backup battery path for charging the back-end load L.

When the power conversion component of the charger 2 is enabled and the microcontroller 1 uses the electricity detector QD to detect that power of the backup battery 5 does not reach a saturated state, the microcontroller 1 instructs the charger 2 to use the vehicle power supply P for charging the back-end load L and the backup battery 5. When the power conversion component of the charger 2 is enabled and the microcontroller 1 uses the electricity detector QD to detect that the power of the backup battery 5 reaches the saturated state, the microcontroller 1 instructs the charger 2 to use the vehicle power supply P for charging the back-end load L. When the power conversion component of the charger 2 is disabled and the power of the backup battery 5 does not reach the saturated state, the microcontroller 1 instructs the charger 2 to stop charging the back-end load L by the vehicle power supply P, and instructs the charger 2 to use the vehicle power supply P for charging the backup battery 5.

The microcontroller 1 is used to control the first switch circuit 3 to be in the on state or in the off state, and to control the second switch circuit 4 to be in the on state or in the off state. The microcontroller 1 is also used to drive the light emitting element 6 to emit light. The light emitting element 6 includes, for example, a plurality of light emitting diodes having different colors. However, the present disclosure is not limited thereto.

Figure 3:
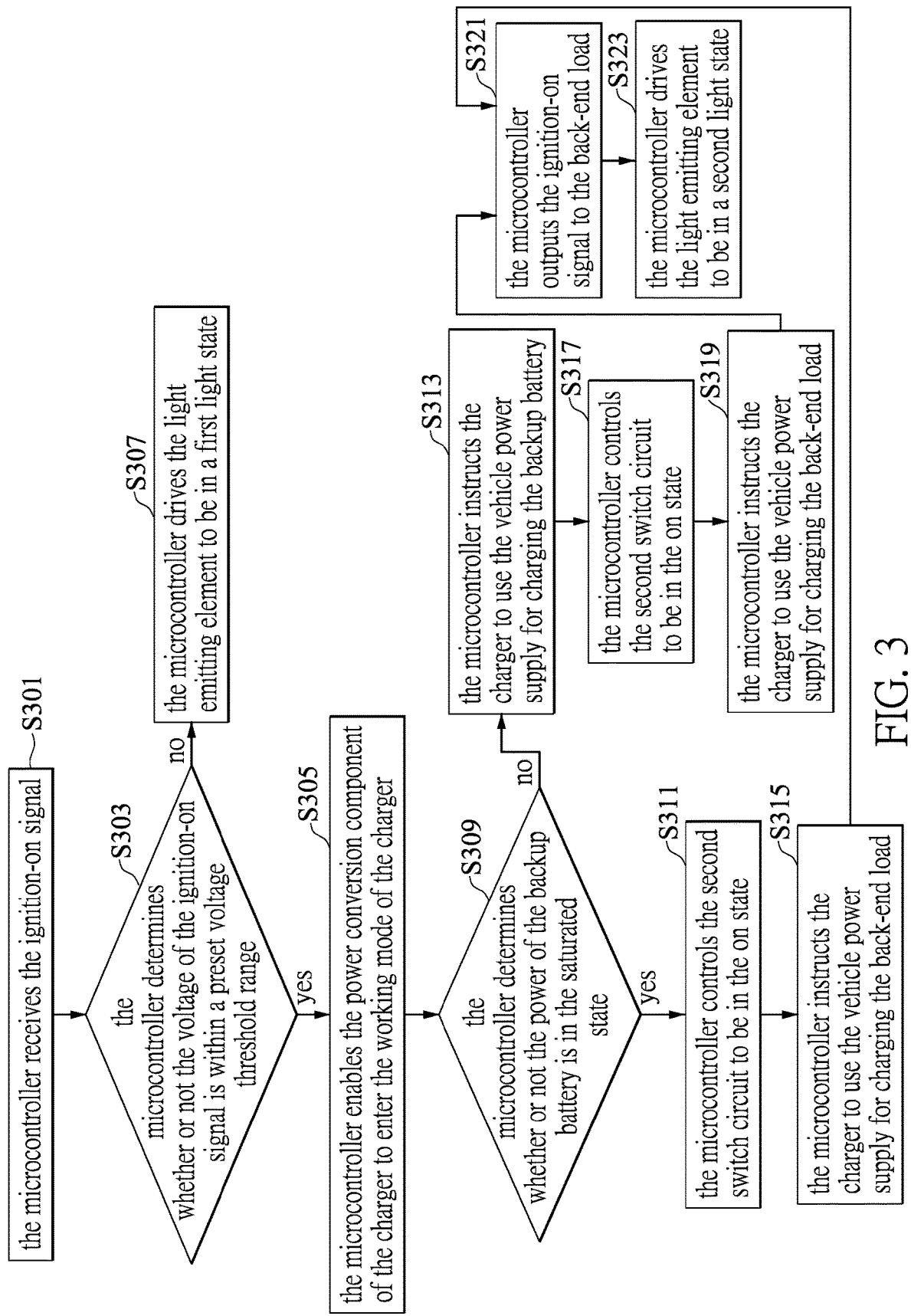
FIG. 3 is a flowchart illustrating one example of a power management method when an ignition-on event occurs to the vehicle power management system of FIG. 2.

FIG. 3 is a flowchart illustrating one example of a power management method when an ignition-on event occurs to the vehicle power management system of FIG. 2. Referring to FIG. 3, in step S301, the microcontroller 1 receives the ignition-on signal. In step S303, the microcontroller 1 determines whether or not the voltage of the ignition-on signal is within a preset voltage threshold range. If so, step S303 is followed by step S305. If not, step S303 is followed by step S307. In step S305, the microcontroller 1 enables the power conversion component of the charger 2 to enter the working mode of the charger 2. In step S307, the microcontroller 1 drives the light emitting element 6 to be in a first light state. For example, when the light emitting element 6 is in the first light state, a blue light diode of the light emitting element 6 is in a steady light state, and a green light diode and a red light diode of the light emitting element 6 are in a turned-off state.

Step S305 is followed by step S309. In step S309, the microcontroller 1 determines whether or not the power of the backup battery 5 is in the saturated state. If so, step S309 is followed by step S311. If not, step S309 is followed by step S313. In step S311, the microcontroller 1 controls the second switch circuit 4 to be in the on state. In step S313, the microcontroller 1 instructs the charger 2 to use the vehicle power supply P for charging the backup battery 5.

Step S311 is followed by step S315. In step S315, the microcontroller 1 instructs the charger 2 to use the vehicle power supply P for charging the back-end load L.

Step S313 is followed by step S317. In step S317, the microcontroller 1 controls the second switch circuit 4 to be in the on state.

Step S317 is followed by step S319. In step S319, the microcontroller 1 instructs the charger 2 to use the vehicle power supply P for charging the back-end load L. Specifically, the charger 2 uses the vehicle power supply P to charge the back-end load L and the backup battery 5 at the same time.

After step S315 and step S319, the power management method proceeds to step S321. In step S321, the microcontroller 1 outputs the ignition-on signal to the back-end load L.

Step S321 is followed by step S323. In step S323, the microcontroller 1 drives the light emitting element 6 to be in a second light state. For example, when the light emitting element 6 is in the second light state, the green light diode is in the steady light state, and the blue light diode and the red light diode are in the turned-off state.

Figures 2, 4A:
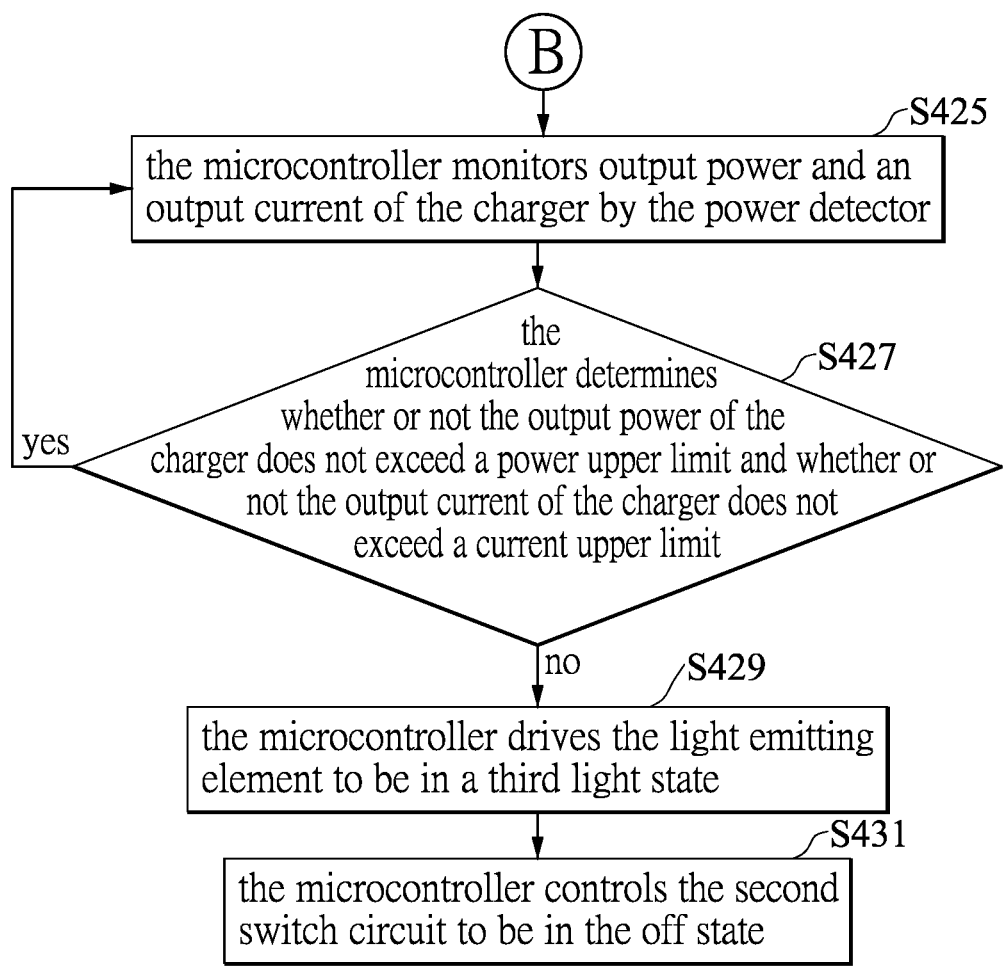
Figure 4B:
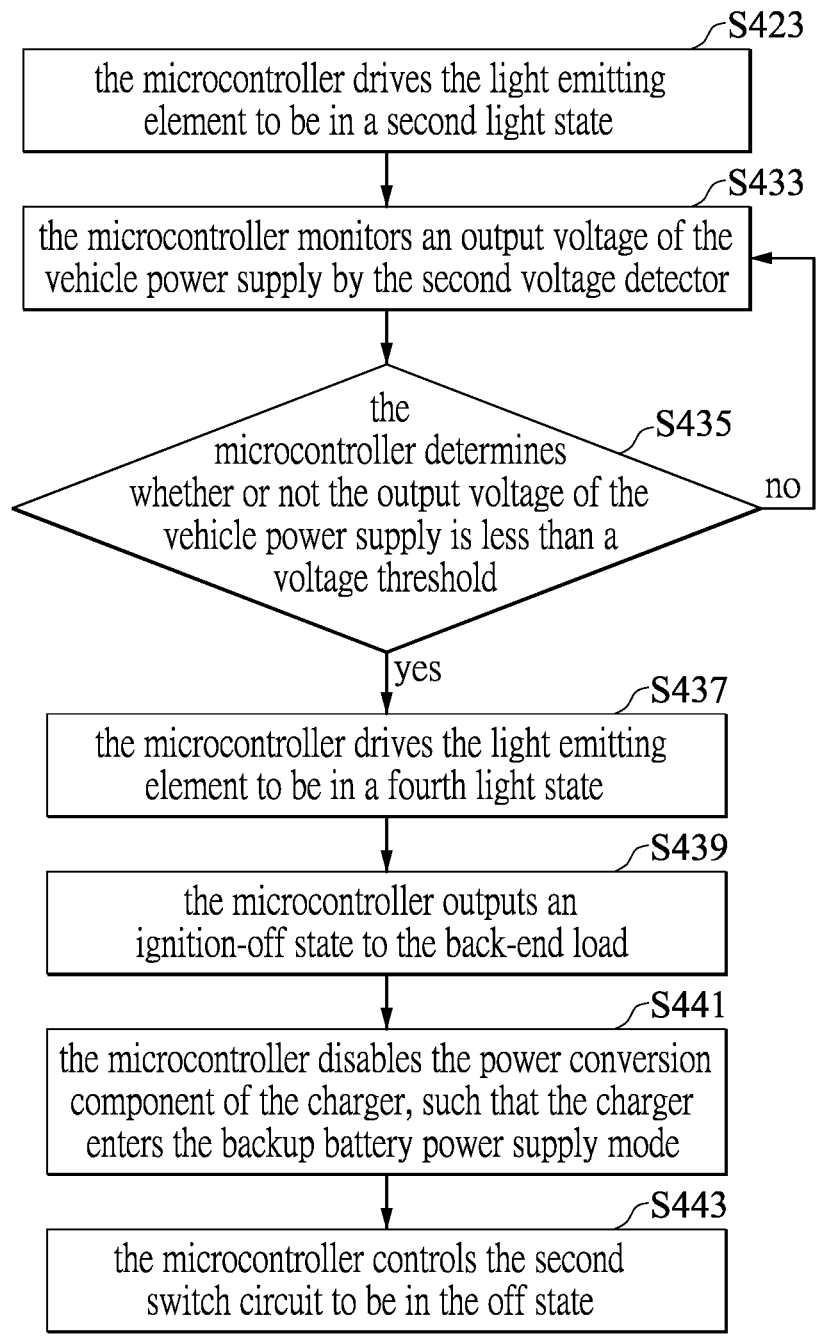

FIG. 4A-1, FIG. 4A-2 and FIG. 4B are flowcharts illustrating another example of the power management method when the ignition on-event occurs to the vehicle power management system of FIG. 2. Steps S401 to S423 of FIG. 4A-1 are the same as steps S301 to S323 of FIG. 3. Different from the power management method of FIG. 3, the power management method of FIG. 4A-2 and FIG. 4B further includes steps S425 to S443.

Step S423 is followed by step S425. In step S425, the microcontroller 1 monitors output power and an output current of the charger 2 by the power detector PD. In step S427, the microcontroller 1 determines whether or not the output power of the charger 2 does not exceed a power upper limit and whether or not the output current of the charger 2 does not exceed a current upper limit. If the output power does not exceed the power upper limit and the output current does not exceed the current upper limit, the power management method returns to step S425. If the output power exceeds the power upper limit and/or the output current exceeds the current upper limit, step S427 is followed by step S429. In step S429, the microcontroller 1 drives the light emitting element 6 to be in a third light state. For example, when the light emitting element 6 is in the third light state, the red light diode is in the steady light state, and the blue light diode and the green light diode are in the turned-off state. In step S431, the microcontroller 1 controls the second switch circuit 4 to be in the off state.

Step S423 is further followed by step S433. In step S433, the microcontroller 1 monitors an output voltage of the vehicle power supply P by the second voltage detector VD2. In step S435, the microcontroller 1 determines whether or not the output voltage of the vehicle power supply P is less than a voltage threshold. If so, step S435 is followed by step S437. If not, the power management method returns to step S433.

In step S437, the microcontroller 1 drives the light emitting element 6 to be in a fourth light state. For example, when the light emitting element 6 is in the fourth light state, the blue light diode is in a blinking light state, and the green light diode and the red light diode are in the turned-off state.

Step S437 is followed by step S439. In step S439, the microcontroller 1 outputs an ignition-off state to the back-end load L. In step S441, the microcontroller 1 disables the power conversion component of the charger 2, such that the charger 2 enters the backup battery power supply mode. In step S443, the microcontroller 1 controls the second switch circuit 4 to be in the off state. For example, when the back-end load L is in a heavy load state, the output voltage of the vehicle power supply P will be decreased. When the output voltage of the vehicle power supply P is less than a preset voltage threshold, the microcontroller 1 stops using the vehicle power supply P to charge the back-end load L, so as to prevent the power of the vehicle power supply P from being exhausted by the back-end load L.

Figure 5B:
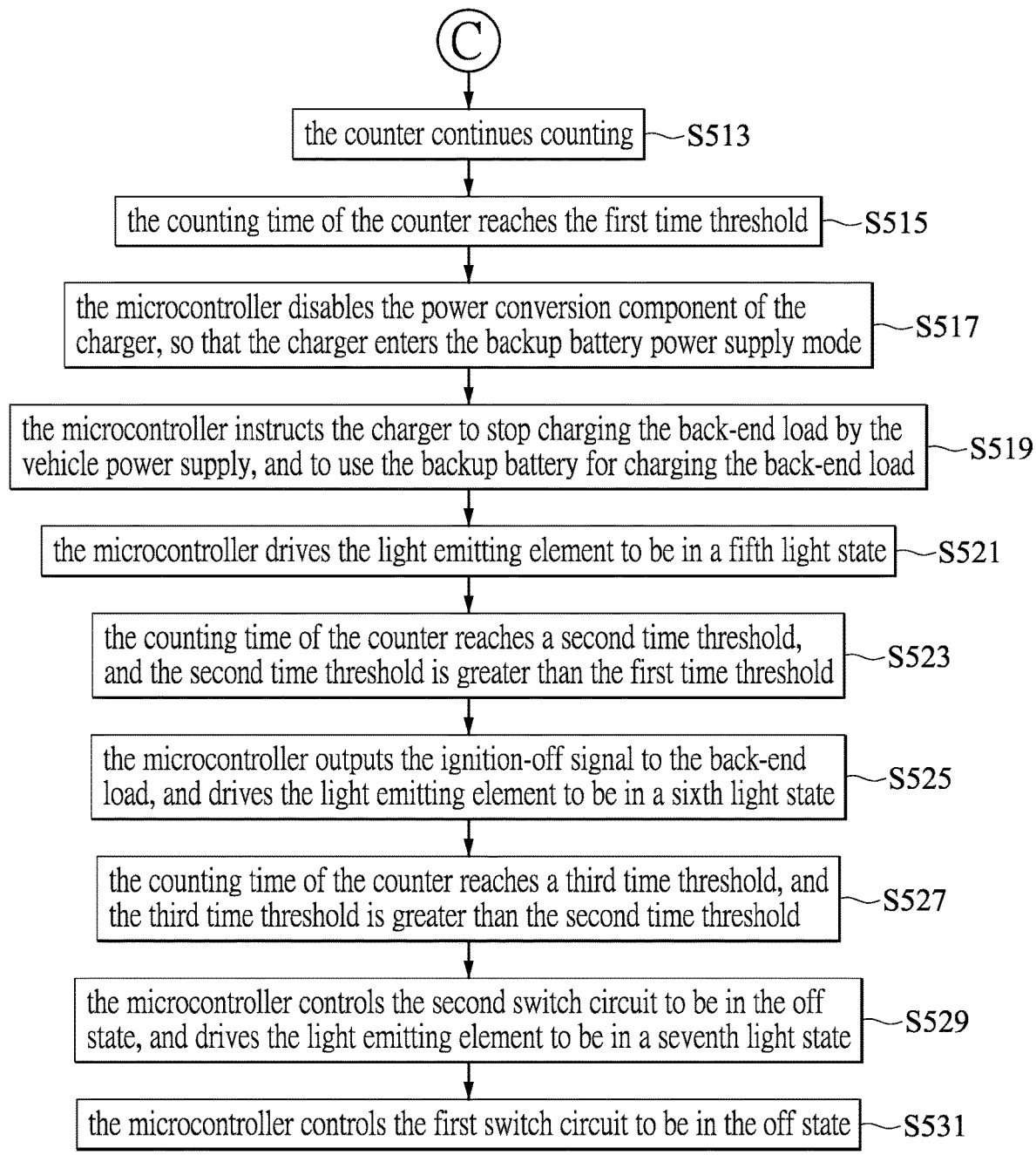

FIG. 5A and FIG. 5B are flowcharts illustrating one example of the power management method when an ignition-off event occurs to the vehicle power management system of FIG. 2. Referring to FIG. 5A, in step S501, the microcontroller 1 receives the ignition-off signal. In step S503, the microcontroller 1 determines whether or not the voltage of the ignition-off signal is less than the voltage threshold. If so, step S503 is followed by step S505. If not, step S503N follows step S503. In step S503N, the power management method ends. In step S505, the microcontroller 1 instructs the charger 2 to stop charging the backup battery 5 by the vehicle power supply P, and to use the vehicle power supply P for charging the back-end load L.

Step S505 is followed by step S507. In step S507, the counter 11 of the microcontroller 1 is activated, and the microcontroller 1 monitors the output voltage of the vehicle power supply P by the second voltage detector VD2. In step S509, before the counting time of the counter 11 reaches a first time threshold, the microcontroller 1 determines whether or not the output voltage of the vehicle power supply P is less than the voltage threshold. If so, step S509 is followed by step S511. If not, step S509 is followed by step S513.

In step S511, the counter 11 of the microcontroller 1 stops counting, and the microcontroller 1 controls the first switch circuit 3 and the second switch circuit 4 to be in the off state.

Referring to FIG. 5B, in step S513, the counter 11 continues counting. Step S513 is followed by step S515. In step S515, the counting time of the counter 11 reaches the first time threshold.

Step S515 is followed by step S517. In step S517, the microcontroller 1 disables the power conversion component of the charger 2, so that the charger 2 enters the backup battery power supply mode. In step S519, the microcontroller 1 instructs the charger 2 to stop charging the back-end load L by the vehicle power supply P, and to use the backup battery 5 for charging the back-end load L. In step S521, the microcontroller 1 drives the light emitting element 6 to be in a fifth light state. For example, when the light emitting element 6 is in the fifth light state, the green light diode is in the blinking light state, and the blue light diode and the red light diode are in the turned-off state.

In step S523, the counting time of the counter 11 reaches a second time threshold, and the second time threshold is greater than the first time threshold. In step S525, the microcontroller 1 outputs the ignition-off signal to the back-end load L, and drives the light emitting element 6 to be in a sixth light state. For example, when the light emitting element 6 is in the sixth light state, the red light diode is in the blinking light state, and the blue light diode and the green light diode are in the turned-off state.

In step S527, the counting time of the counter 11 reaches a third time threshold, and the third time threshold is greater than the second time threshold. In step S529, the microcontroller 1 controls the second switch circuit 4 to be in the off state, and drives the light emitting element 6 to be in a seventh light state. For example, when the light emitting element 6 is in the seventh light state, the blue light diode is in the steady light state, the green light diode is in the blinking light state, and the red light diode is in the turned-off state. In step S531, the microcontroller 1 controls the first switch circuit 3 to be in the off state.

In addition, as long as the ignition-on event occurs during a counting period of the counter 11, the counter 11 of the microcontroller 1 immediately stops counting and clears the accumulated counting time. The counter 11 of the microcontroller 1 is not activated until occurrence of a next ignition-on event.

Figures 1, 6A:
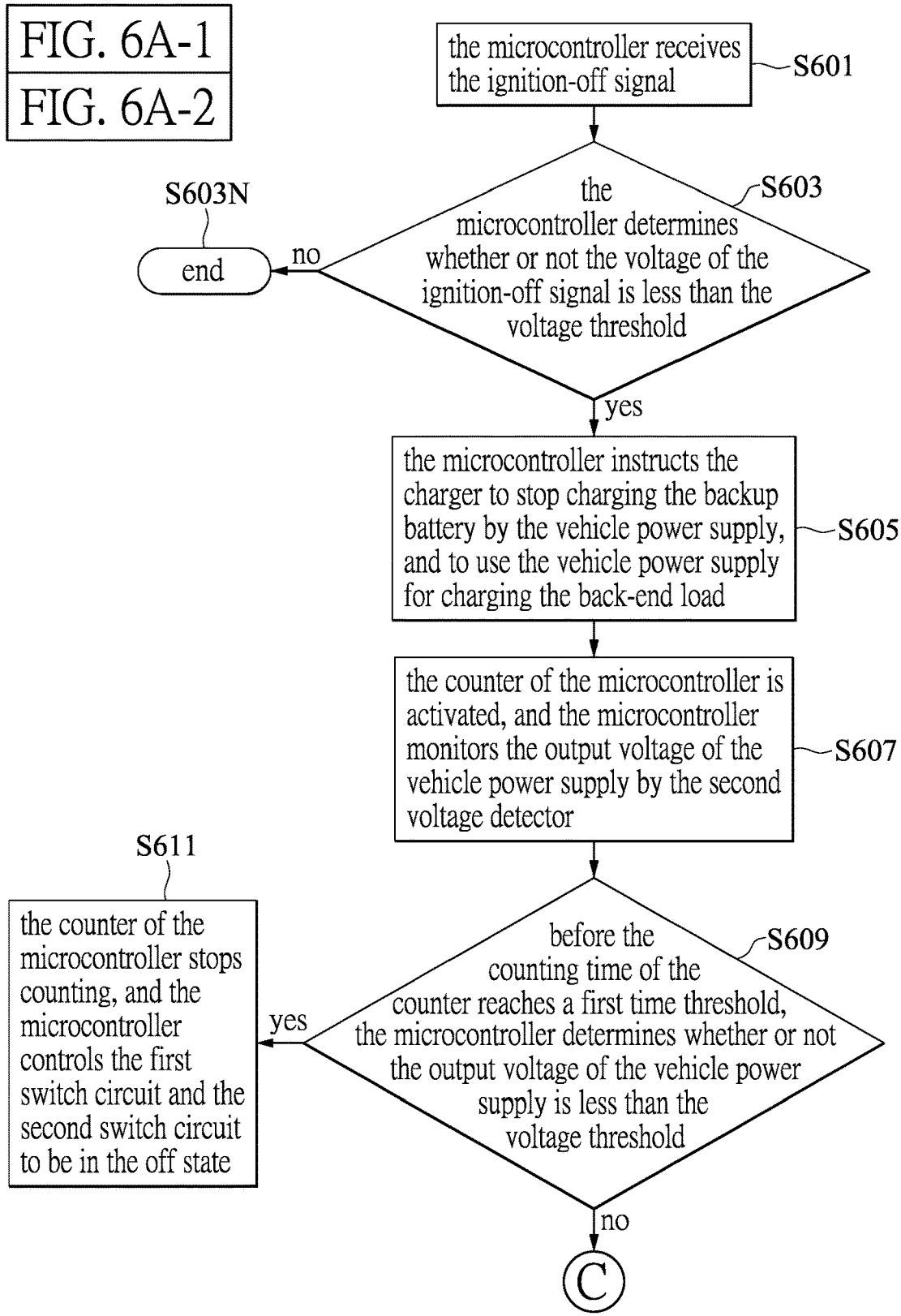
Figures 2, 6A:
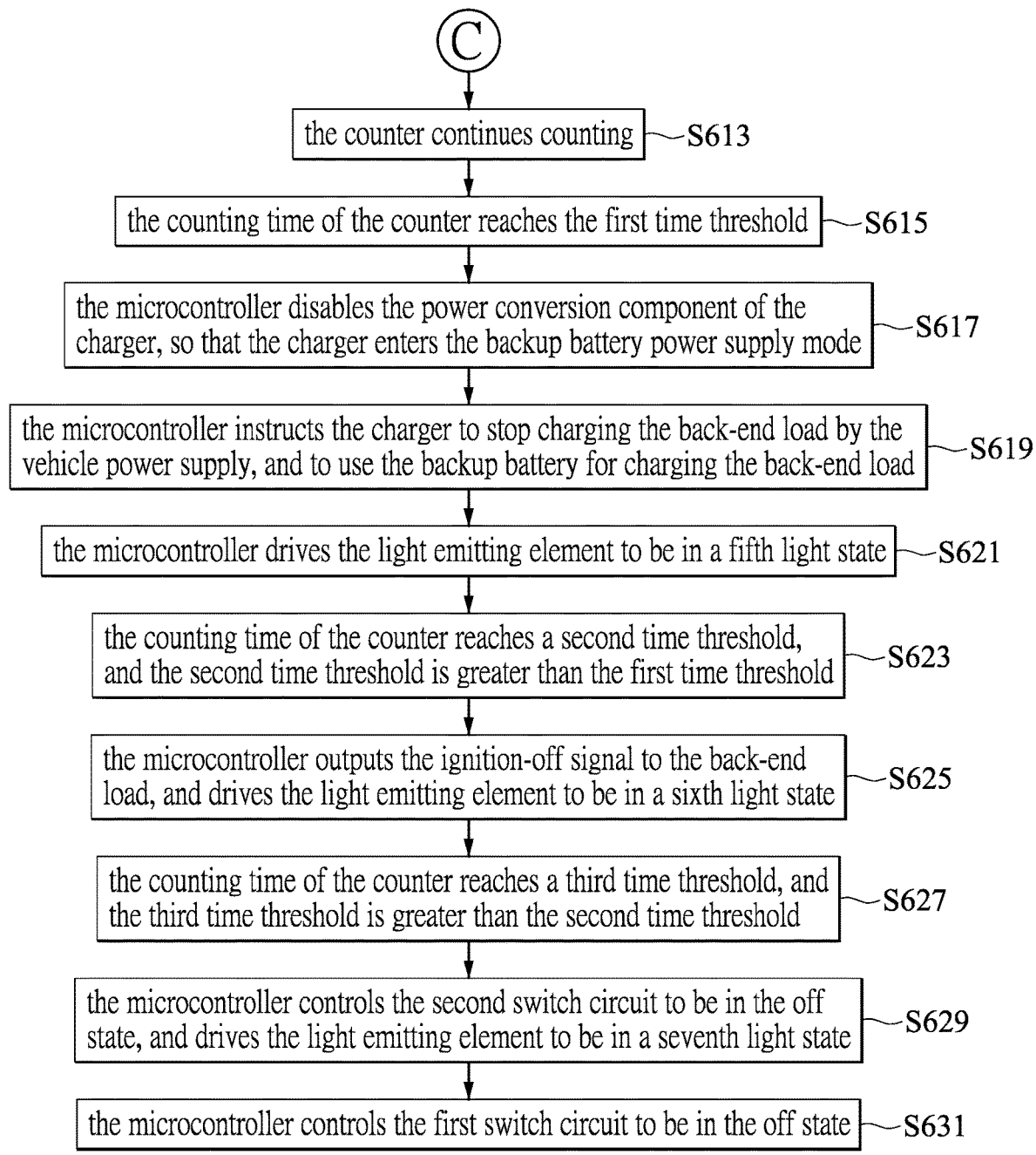
Figure 6B:
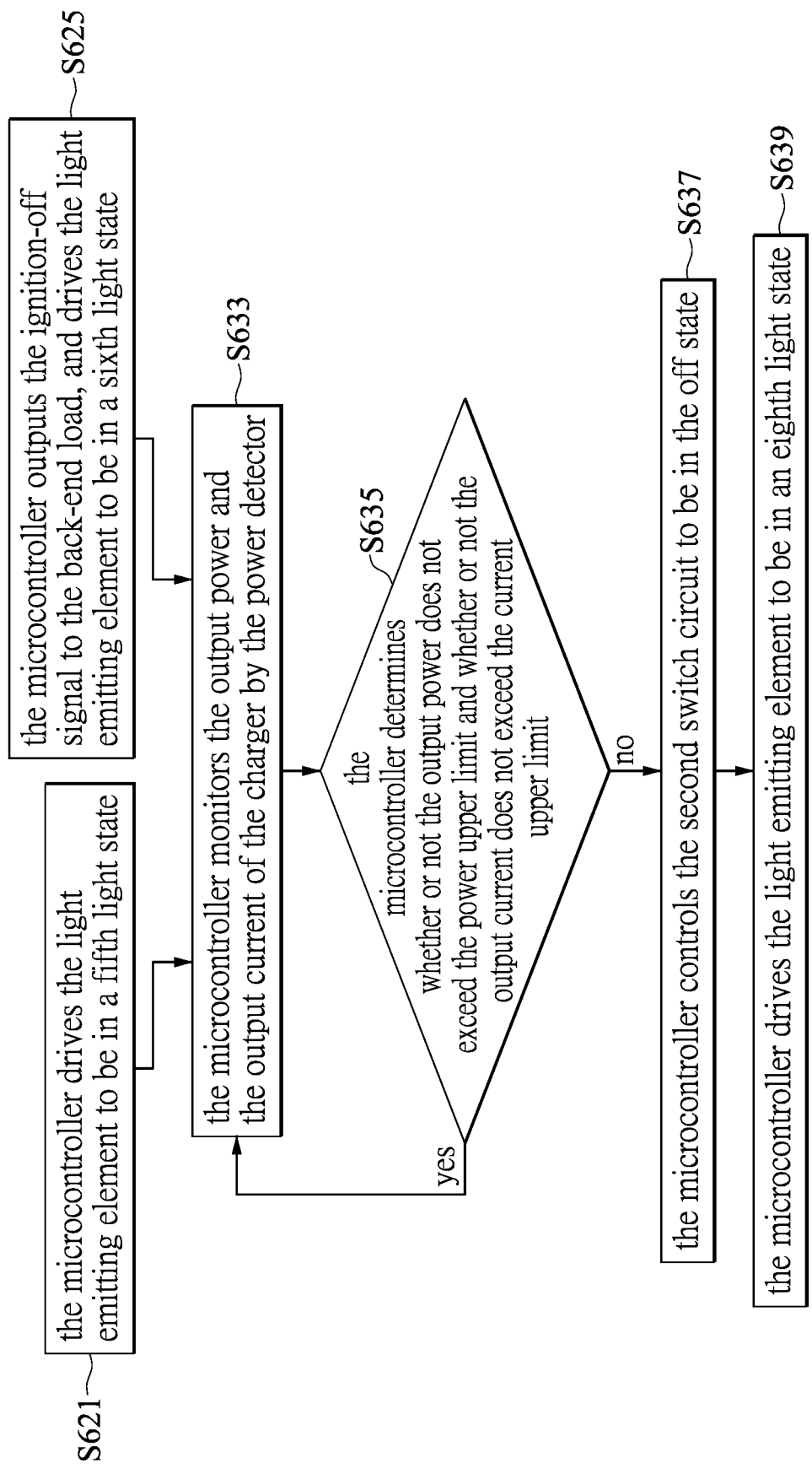
Figure 6C:
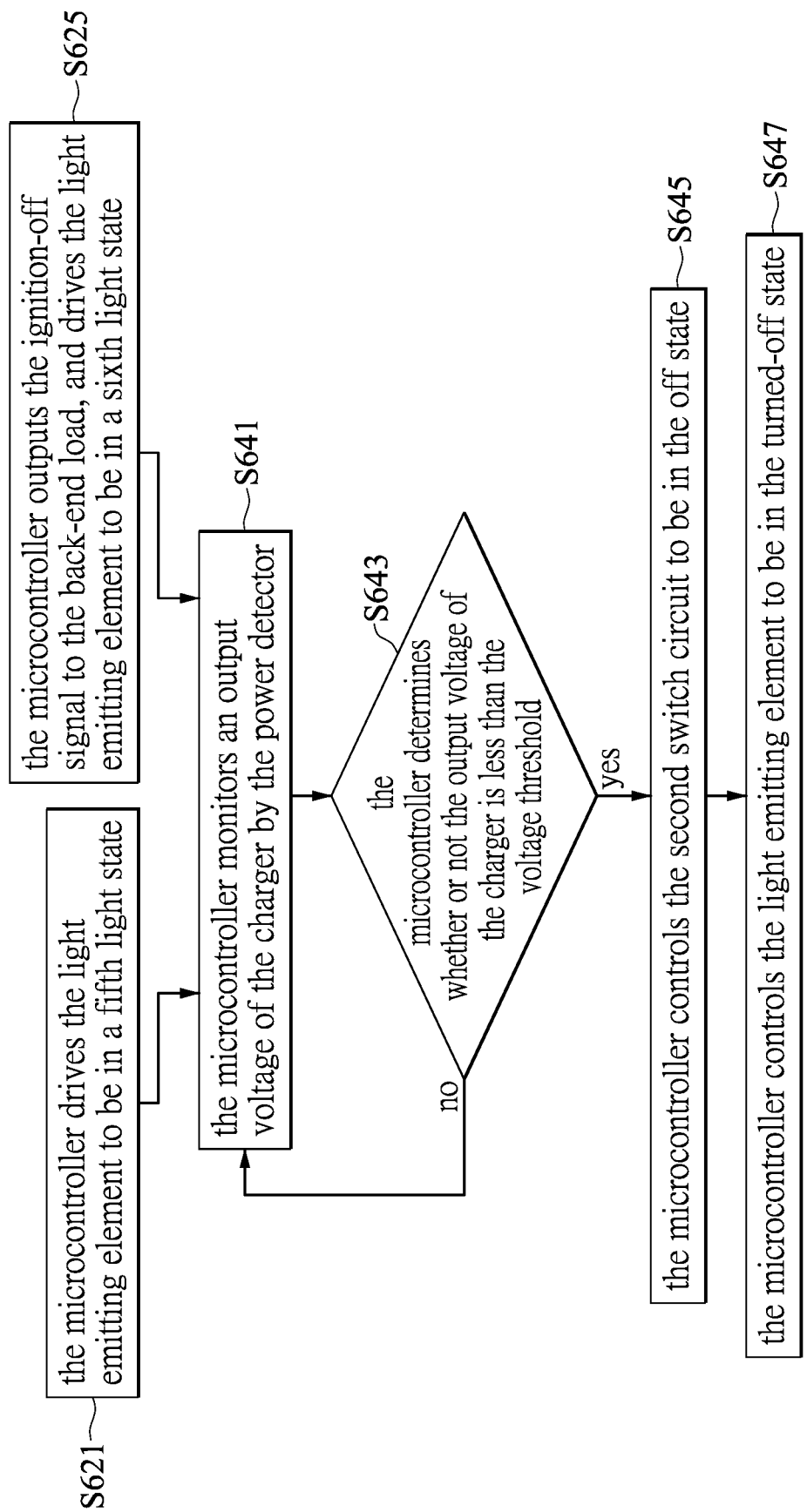

FIG. 6A-1, FIG. 6A-2, FIG. 6B and FIG. 6C are flowcharts illustrating another example of the power management method when the ignition-off event occurs to the vehicle power management system of FIG. 2. Steps S601 to S631 of FIG. 6A-1 and FIG. 6A-2 are the same as steps S501 to S531 of FIG. 5A and FIG. 5B. Different from the power management method of FIG. 5A and FIG. 5B, the power management method of FIG. 6B and FIG. 6C further includes steps S633 to S647.

After step S621 and step S625, the power management method proceeds to step S633. In step S633, the microcontroller 1 monitors the output power and the output current of the charger 2 by the power detector PD. Specifically, after the counting time of the counter 11 of the microcontroller 1 reaches the first time threshold but before the counting time reaches the second time threshold, the microcontroller 1 monitors the output power and the output current of the charger 2 by the power detector PD. After the counting time of the counter 11 of the microcontroller 1 reaches the second time threshold but before the counting time reaches the third time threshold, the microcontroller 1 monitors the output power and the output current of the charger 2 by the power detector PD.

In step S635, the microcontroller 1 determines whether or not the output power does not exceed the power upper limit and whether or not the output current does not exceed the current upper limit. If the output power does not exceed the power upper limit and the output current does not exceed the current upper limit, the power management method returns to step S633. If the output power exceeds the power upper limit and/or the output current exceeds the current upper limit, step S635 is followed by step S637. In step S637, the microcontroller 1 controls the second switch circuit 4 to be in the off state. In step S639, the microcontroller 1 drives the light emitting element 6 to be in an eighth light state. For example, when the light-emitting element 6 is in the eighth light state, the blue light diode is in the steady light state, the green light diode is in the turned-off state, and the red light diode is in the blinking light state.

After step S621 and step S625, the power management method further proceeds to step S641. In step S641, the microcontroller 1 monitors an output voltage of the charger 2 by the power detector PD. Specifically, after the counting time of the counter 11 of the microcontroller 1 reaches the first time threshold but before the counting time reaches the second time threshold, the microcontroller 1 monitors the output voltage of the charger 2 by the power detector PD. After the counting time of the counter 11 of the microcontroller 1 reaches the second time threshold but before the counting time reaches the third time threshold, the microcontroller 1 monitors the output voltage of the charger 2 by the power detector PD.

In step S643, the microcontroller 1 determines whether or not the output voltage of the charger 2 is less than the voltage threshold. If so, step S643 is followed by step S645. If not, the power management method returns to step S641. In step S645, the microcontroller 1 controls the second switch circuit 4 to be in the off state. In step S647, the microcontroller 1 controls the light emitting element 6 to be in the turned-off state. For example, when the light emitting element 6 is in the turned-off state, the blue light diode, the green light diode, and the red light diode are all in the turned-off state.

Beneficial Effects of the Embodiments

In conclusion, in the vehicle power management system and the power management method thereof provided by the present disclosure, time points at which the vehicle power supply and the backup battery charge vehicle load equipment and a time point at which the ignition-off signal is sent to the back-end load can be controlled programmatically. In this way, power of the vehicle power supply will not be excessively consumed by the back-end load, so that the power of the vehicle power supply can be sufficient for the engine to be started again.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A vehicle power management system, which is adapted to a back-end load and a vehicle power supply, the vehicle power management system comprising:
    a microcontroller connected to the vehicle power supply and the back-end load, wherein the microcontroller includes a counter;
    a charger connected to the microcontroller;
    a first switch circuit connected to the charger, the microcontroller, and the vehicle power supply;
    a second switch circuit connected to the microcontroller, the charger, and the back-end load; and
    a backup battery connected to the charger;
    wherein, when the microcontroller receives an ignition-off signal from the vehicle power supply, the microcontroller determines whether or not a voltage of the ignition-off signal is less than a first voltage threshold;
    wherein, when the voltage of the ignition-off signal is less than the first voltage threshold, the charger stops using the vehicle power supply to charge the backup battery, and uses the vehicle power supply to charge the back-end load;
    wherein, when a counting time of the counter reaches a first time threshold, the charger stops using the vehicle power supply to charge the back-end load, and uses the backup battery to charge the back-end load;
    wherein, when the counting time of the counter reaches a second time threshold, the microcontroller sends the ignition-off signal to the back-end load;
    wherein, when the counting time of the counter reaches a third time threshold, the charger stops using the backup battery to charge the back-end load.

2. The vehicle power management system according to claim 1, further comprising a light emitting element, wherein the light emitting element is connected to the microcontroller; wherein, when the microcontroller receives an ignition-on signal from the vehicle power supply, the microcontroller determines whether or not a voltage of the ignition-on signal is within a voltage threshold range; wherein, when the voltage of the ignition-on signal is within the voltage threshold range, the charger provides power of the vehicle power supply to the back-end load; wherein, when the voltage of the ignition-on signal is not within the voltage threshold range, the microcontroller drives the light emitting element to emit light.

3. The vehicle power management system according to claim 2, wherein, when the voltage of the ignition-on signal is within the voltage threshold range and power of the backup battery does not reach a saturated state, the charger uses the vehicle power supply to charge the backup battery.

4. The vehicle power management system according to claim 2, wherein, when the voltage of the ignition-on signal is within the voltage threshold range, the microcontroller controls the second switch circuit to be in an on state; wherein, when the second switch circuit is in the on state, the microcontroller sends the ignition-on signal to the back-end load.

5. The vehicle power management system according to claim 4, wherein, when the back-end load receives the ignition-on signal and an output voltage of the vehicle power supply is less than a second voltage threshold, the microcontroller outputs the ignition-off signal to the back-end load.

6. The vehicle power management system according to claim 1, wherein, when an output power of the charger exceeds a power upper limit or an output current of the charger exceeds a current upper limit, the microcontroller controls the second switch circuit to be in an off state.

7. A power management method of a vehicle power management system, comprising:
    determining, by a microcontroller, whether or not a voltage of an ignition-off signal is less than a first voltage threshold when the microcontroller receives the ignition-off signal;
    stopping a vehicle power supply from charging a backup battery, and using the vehicle power supply to charge a back-end load when the voltage of the ignition-off signal is less than the first voltage threshold;
    activating a counter of the microcontroller;
    stopping the vehicle power supply from charging the back-end load, and using the backup battery to charge the back-end load when a counting time of the counter reaches a first time threshold;
    sending, by the microcontroller, the ignition-off signal to the back-end load when the counting time of the counter reaches a second time threshold; and
    stopping the backup battery from charging the back-end load when the counting time of the counter reaches a third time threshold.

8. The power management method according to claim 7, further comprising: monitoring an output voltage of the vehicle power supply; wherein, when the output voltage of the vehicle power supply is less than a second voltage threshold, the counter stops counting, and the vehicle power supply is not used to charge the back-end load.

9. The power management method according to claim 7, further comprising: determining, by the microcontroller, whether or not a voltage of an ignition-on signal is within a voltage threshold range when the microcontroller receives the ignition-on signal; wherein, when the voltage of the ignition-on signal is within the voltage threshold range, a power conversion component of a charger is enabled; wherein, when the voltage of the ignition-on signal is not within the voltage threshold range, a light emitting element is driven to emit light.

10. The power management method according to claim 9, further comprising: determining whether or not power of the backup battery reaches a saturated state after the power conversion component is enabled; wherein, when the power of the backup battery does not reach the saturated state, the vehicle power supply is used to charge the backup battery.

11. The power management method according to claim 10, further comprising: sending, by the microcontroller, the ignition-on signal to the back-end load after the vehicle power supply is used to charge the backup battery.

12. The power management method according to claim 11, further comprising: determining, by the microcontroller, whether or not an output voltage of the vehicle power supply is less than a second voltage threshold after the ignition-on signal is sent to the back-end load; wherein, when the output voltage of the vehicle power supply is less than the second voltage threshold, the microcontroller outputs the ignition-off signal to the back-end load.

* * * * *